(No Model.)
C. L. WAGANDT.
SOLDERING TOOL.
No. 402,634. Patented May 7, 1889.
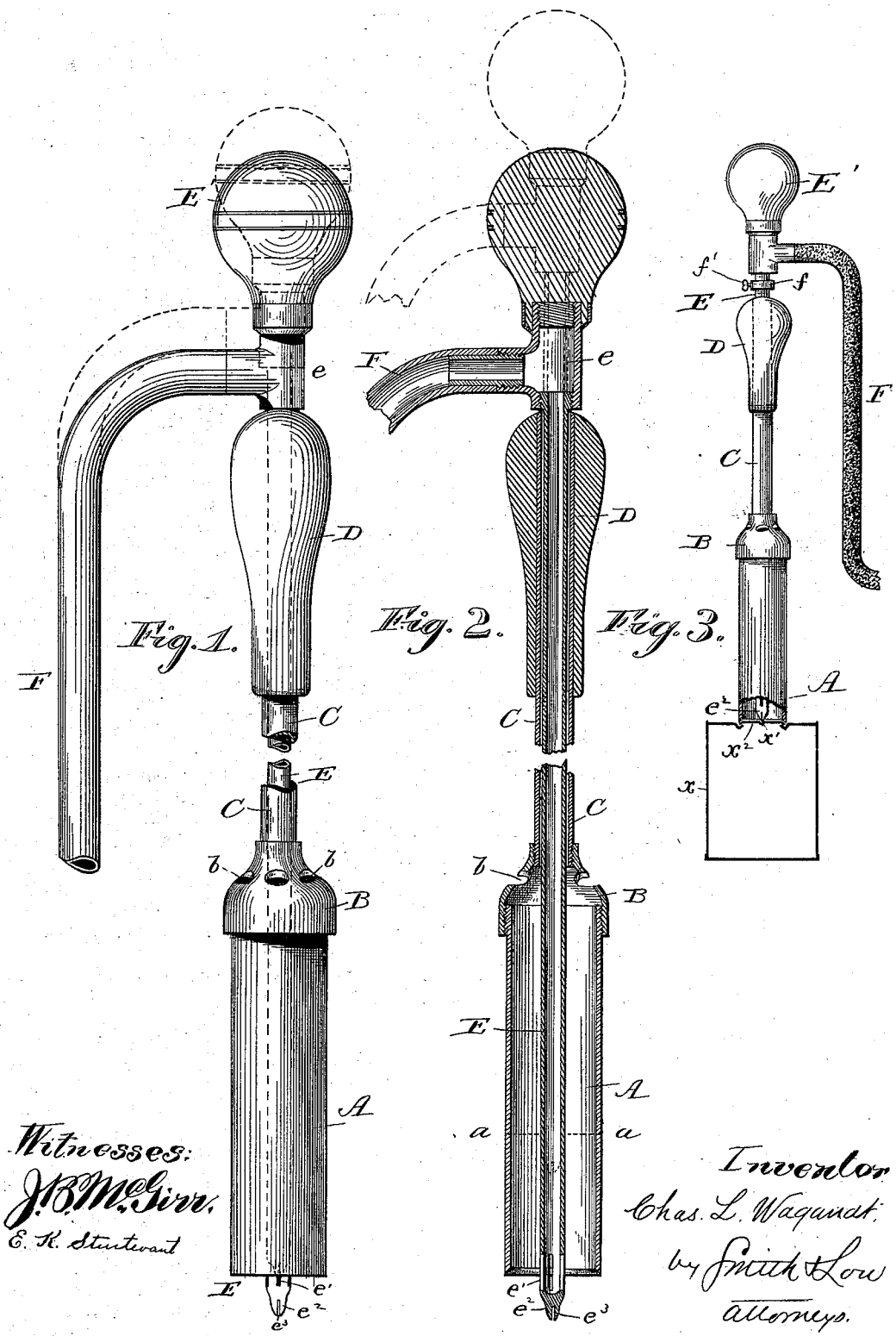

UNITED STATES PATENT OFFICE.

CHARLES L. WAGANDT, OF BALTIMORE, MARYLAND, ASSIGNOR OF ONE-HALF TO KEEN & HAGERTY, OF SAME PLACE.

SOLDERING-TOOL.

SPECIFICATION forming part of Letters Patent No. 402,634, dated May 7, 1889.

Application filed December 22, 1888. Serial No. 294,368. (No model.)

*To all whom it may concern:*

Be it known that I, CHARLES L. WAGANDT, a citizen of the United States, residing in the city of Baltimore, in the State of Maryland, have invented certain new and useful Improvements in Soldering-Tools; and I do declare the following to be a full, clear, and exact description of the invention, such as will enable others skilled in the art to which it appertains to make and use the same.

My present invention relates to that class of soldering-tools in which the soldering end or tip is heated by a flame issuing from a burner carried by the tool and to which a suitable gaseous fuel is conducted.

It is the object of the invention to provide a soldering-tool especially adapted for securing in place the covers or caps of cans, and it is particularly directed to obtaining in such a tool simplicity of construction, convenience and quickness in use, economy of gas, and durability and economy of the soldering-tip.

According to my invention the soldering end or tip is made in the form of a hollow cylinder or sector of the same, the radius of which will depend upon the size of the caps to the securing of which the tool is to be applied. This tip is preferably of copper and substantially uniform in cross-section and thickness. Concentric with the arc or circle of the soldering-tip is the gas-supply tube, provided with burner-orifices, whereby a heating flame or flames are caused to impinge against the inner side of the tip at or near its extremity. The soldering-tip and its shank are constructed both to slide upon and to turn freely around the burner-tube, whereby the parts are mutually self-adjusting in the act of soldering a cap and the rotation of the tip necessary to such operation permitted without twisting or disturbing the gas-supply devices. It therefore results that neither the wearing away of the soldering-tip nor the attachment of the gas-supply pipe to the burner-tube impairs the efficiency of the tool or the quickness of the capping operation.

In order to make my invention more clearly understood, I have shown in the accompanying drawings a means for carrying the same into effect.

In said drawings, Figure 1 is a side view of a soldering-tool embodying my invention. Fig. 2 is a sectional view of the same. Fig. 3 is a view on a smaller scale, illustrating the application of the tool to a can in the capping operation.

Referring to the drawings, A indicates the soldering end or tip, made, preferably, of copper and in the form of a hollow cylinder of substantially uniform diameter and thickness. The wearing away of this tip—for instance, to the point indicated by the dotted line $a\ a$ in Fig. 2—therefore makes no difference in the efficiency of the tool nor prevents it from properly fitting the cap. Practically the entire tip may thus be consumed and very little wasted. From time to time the soldering-edge may be dressed as desired. If preferred, such dressing or shaping may give a flaring or bell-mouthed form to the tip.

At its upper end the cylindrical tip A is provided with a screw-thread, by means of which it is secured in a correspondingly-threaded holder, B. Ventilating-apertures $b$ are formed in the latter for the escape of the products of combustion. The holder is carried by a tubular shank, C, which has at its upper end a wooden or other non-conducting handle, D. By said handle the shank, holder, and soldering-tip may be rotated during the soldering operation.

E is the burner-tube, which passes through and is concentric with the parts above described. The burner-tube is provided with a coupling-piece, $e$, to the lateral branch of which a flexible gas-supply tube, F, is attached, and to the upper end of which a handle, E', is secured. The tube F is supplied with a suitable gaseous fuel—such as a mixture of air and illuminating-gas.

The burner-tube E fits loosely within the shank C, and when held in an upright position upon the top of a can, $x$, (see Fig. 3,) by the handle E' serves as an axis upon which the soldering cylinder or tip A may be revolved by handle D. It will be seen that during this operation, the combined burner and pivot tube being stationary, an uninterrupted supply of gas may enter the tool through the flexible pipe F and be furnished to the rotating tip.

At $e'$ are shown suitable burner slits or orifices in the sides of the tube E at or near its lower end. A flame or flames burning at said orifices will be directed outward against the inner side of the cylindrical tip A and keep the latter always at the necessary temperature.

When it is desired to apply the tool to the soldering of a cap, the latter is laid in place upon the top of the can with the proper amount of solder in the groove of the can-top. The tool is then lifted by handle D, the parts of the tool being in the positions shown in Fig. 1, and placed upon the cap, around the edges of which the open end of the cylindrical tip A fits. The tool is thus automatically centered over the cap. As the tool is thus applied, the point $e^2$ of the burner-tube comes in contact with the top of the cap, and said tube is forced up, with its handle E' and supply-pipe, relative to the soldering-tip and shank until the parts occupy the positions shown in dotted lines in Fig. 1 or in full lines in Fig. 3.

The centering of the tool already described brings the point $e^2$ over the small vent-orifice and depression $x'$ in the can-cap $x^2$. The point drops into such depression; but provision is made for the escape of air from the can through the vent by forming the point $e^2$ with a vertical slit, $e^3$, which prevents said point from closing the vent. The tool being in this position, the operator now holds the same in place by handle E' and rotates the soldering-tip, as already described, by handle D. The melting of the solder takes place instantly, and handle D and tip A are then raised till the latter clears the cap. The parts are held in this position for a moment till the solder has hardened, and the point $e^2$ is then removed from the cap. This completes the operation. It will thus be seen that the burner-tube serves as a holder for the cap while the soldering-tip is being removed and until the solder cools and fixes the cap permanently in place.

In order to insure that when the tool is not being applied to the can the burner-orifices shall be in proper position to direct the heating-flames against the desired portion of the cylindrical tip, I may provide the burner-tube with an adjustable stop. Such a stop is shown in Fig. 3, consisting of a collar, $f$, upon the burner-tube above the shank C, and provided with a set-screw, $f'$, by which it may be clamped to said tube in the desired position. As the tip A wears away, said collar may be moved gradually downward, so that when it comes in contact with the upper end of shank C orifices $e'$ will be opposite the soldering-edge of the tip A, and will be so held till the burner-tube is forced upward in the act of soldering.

Having thus described my invention, what I claim is—

1. In a soldering-tool, the combination of a central burner-tube having lateral jet-orifices at its lower end, a soldering tip or iron mounted and adapted to slide longitudinally on said tube, and a stop on said tube whereby said motion is arrested when the jet-orifices are opposite to the end of the soldering-tip, said stop being adjustable to compensate for the consumption of the tip, substantially as set forth.

2. In a soldering-tool, the combination of a central burner-tube having lateral jet-orifices at its lower end, a soldering tip or iron consisting of a hollow cylinder mounted and adapted to slide longitudinally on said tube, and a stop on said tube whereby said motion is arrested when the jet-orifices are opposite to the inner surface of the lower end of the cylinder, said stop being adjustable to compensate for the consumption of the tip, substantially as set forth.

In testimony whereof I affix my signature in the presence of two witnesses.

CHARLES L. WAGANDT.

Witnesses:
JNO. T. MADDOX,
H. N. LOW.